US006063222A

United States Patent [19]

Deal

[11] Patent Number: 6,063,222

[45] Date of Patent: May 16, 2000

[54] METHOD AND APPARATUS FOR STRENGTHENING A WRITING INSTRUMENT

[76] Inventor: Branden Deal, 7701 Renner Rd., Shawnee, Kans. 66217

[21] Appl. No.: 08/820,767

[22] Filed: Mar. 19, 1997

[51] Int. Cl.[7] .......... B32B 1/10

[52] U.S. Cl. .......... 156/215; 156/DIG. 6; 40/334

[58] Field of Search .......... 156/218, DIG. 6, 156/215; 40/334; 428/42.1, 41.8; 401/48, 131; 206/460, 813; 283/101; 434/98

[56] References Cited

U.S. PATENT DOCUMENTS

| | | | |
|---|---|---|---|
| 1,830,236 | 11/1931 | Metz | 156/86 |
| 2,067,466 | 1/1937 | Thomas | 401/131 |
| 2,153,144 | 4/1939 | Gilfillan | 493/334 |
| 2,636,297 | 4/1953 | Johnson | 40/638 |
| 2,783,172 | 2/1957 | Avery | 206/447 |
| 4,747,619 | 5/1988 | Sager | 462/67 |
| 5,522,960 | 6/1996 | Rello et al. | 516/215 |

*Primary Examiner*—Francis J. Lorin

*Attorney, Agent, or Firm*—Hovey, Williams, Timmons & Collins

[57] ABSTRACT

A method and apparatus for strengthening a writing instrument (11) such as a crayon with a self-adhesive wrap (14) having a writing zone (20) printed thereon is disclosed. The wrap (14) is applied to the writing instrument (11) to strengthen the writing instrument against breakage and to display the writing zone (20) to permit a child to personalize and identify his or her writing instruments.

1 Claim, 1 Drawing Sheet

Fig. 1.
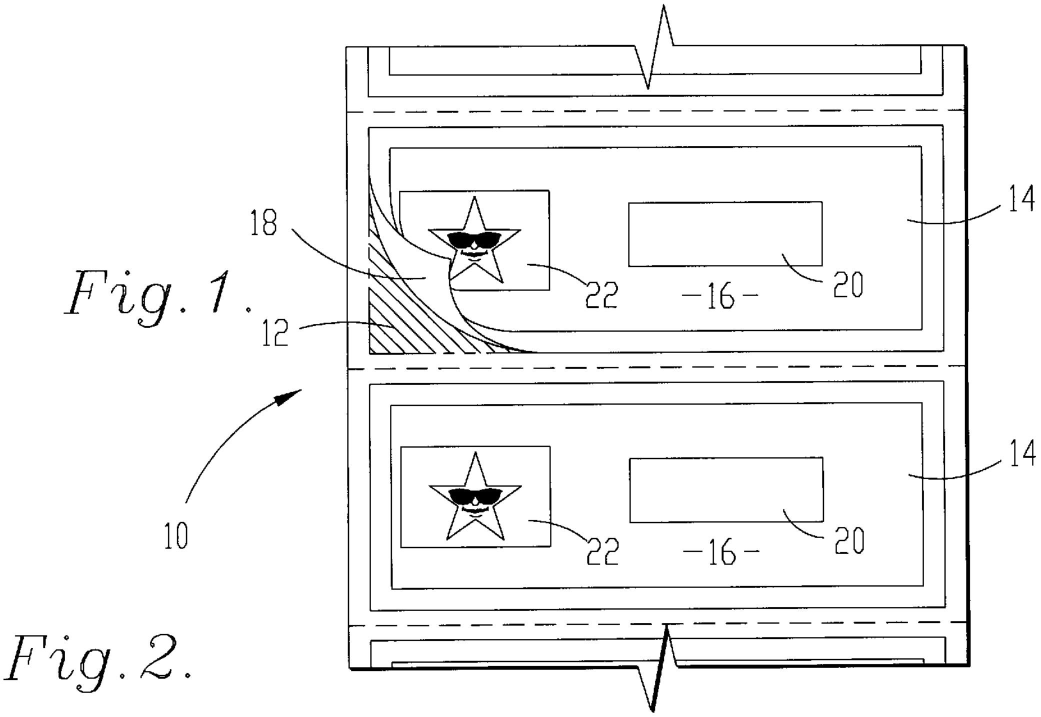
Fig. 2.
Fig. 3.
Fig. 4.
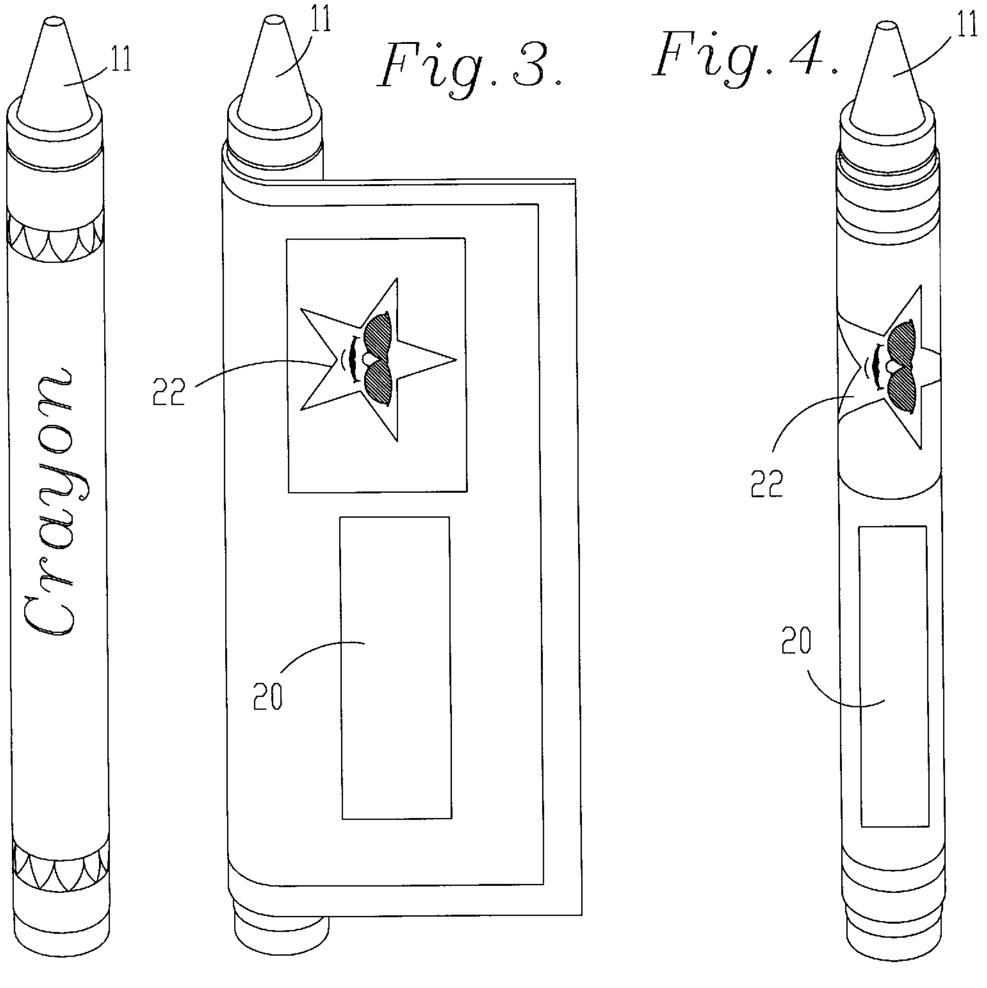

METHOD AND APPARATUS FOR STRENGTHENING A WRITING INSTRUMENT

BACKGROUND OF THE INVENTION

1. Field of the Invention

The present invention relates to a method and apparatus for strengthening a writing instrument. More particularly, the invention relates to a method and apparatus for strengthening a writing instrument with a self-adhesive wrap having a writing zone printed thereon.

2. Description of the Prior Art

Crayons, chalk, and pencils are often broken during use and when they are dropped. This is especially true with children's crayons.

Crayons are typically wrapped with a paper layer after manufacture. However, these paper layers are designed primarily to shield a child's hands from the crayon material and to improve the child's grip of the crayons, but are too thin to prevent breakage of the crayons when they are dropped or mishandled.

Another problem with crayons, pencils and chalk is that children often lose them or intermingle them with other children's crayons, pencils and chalk while the children are working or playing together. Parents can attest that the cost for replacing lost and/or broken crayons and pencils can be quite high.

OBJECTS AND SUMMARY OF THE INVENTION

In view of the foregoing, it is an object of the present invention to provide a method and apparatus for strengthening breakable writing instruments such as crayons, chalk and pencils.

It is another object of the present invention to provide such a strengthening method and apparatus that permits children to mark, personalize and identify their writing instruments to prevent loss and intermingling of the instruments.

The present invention achieves these objects and other objects that become evident from the description of the preferred embodiments of the invention herein by providing a method and apparatus for strengthening writing instruments. The preferred method is implemented by first creating a strengthening apparatus including an elongated release layer and at least one wrap layer positioned on the release layer. The wrap layer has a top surface and a bottom, self-adhesive surface. The wrap has a length less than the length of the writing instrument to be covered and a width substantially equal to the circumference of the writing instrument.

A writing zone is then printed on the top surface of the wrap. A child can write his or her name or some other identifying mark in this writing zone. Designs can also be printed on the top surface of the wrap adjacent the writing zone to decorate the wrap.

The wrap is then removed from the release layer and wrapped around the circumference of the writing instrument. This not only strengthens the writing instrument, but also displays the writing zone on the exterior of the writing instrument so that the child can identify his or her writing instruments.

The present invention can be incorporated into an educational or learning program for children. For example, a set of the wraps could be sold with or alongside a box of crayons. The wraps in the set could each be formed of paper that is colored to match the color of a particular crayon in the box of crayons.

The program would instruct a child to write his or her name in the writing zone of each wrap, match each wrap with its corresponding crayon, and then apply the wraps to the corresponding crayons. This program would not only teach a child how to strengthen and personalize his or her crayons, but would also teach color matching.

BRIEF DESCRIPTION OF THE DRAWING FIGURES

A preferred embodiment of the present invention is described in detail below with reference to the attached drawing figures, wherein:

FIG. 1 is a fragmented top view of a plurality of strengthening apparatus constructed in accordance with a preferred embodiment of the invention;

FIG. 2 is a perspective view depicting a crayon before it is wrapped with the apparatus of the present invention;

FIG. 3 is a perspective view of the crayon depicting the application of the wrap around the circumference of the crayon; and FIG. 4 is a perspective view of the crayon with the wrap applied to the crayon.

DETAILED DESCRIPTION OF THE PREFERRED EMBODIMENTS

FIG. 1 illustrates a strengthening apparatus 10 constructed in accordance with a preferred embodiment of the invention. The strengthening apparatus 10 is configured for strengthening a writing instrument 11 such as a crayon, chalk, or pencil and broadly includes an elongated release layer 12 and a plurality of wrap layers 14 positioned atop the release layer.

In more detail, the strengthening apparatus 10 is preferably created in a conventional label-making process. The release layer 12 is preferably formed of wax paper or other suitable release material, and each wrap layer 14 is preferably formed of paper.

Each wrap layer 14 is preferably rectangular-shaped and has a top surface 16 and a bottom surface 18. The bottom surface is coated with an adhesive. Each wrap layer 14 has a length less than the length of the writing instrument 11 to be covered so that it doesn't cover the tip of the instrument and a width substantially equal to the circumference of the writing instrument.

After or during the production of the apparatus 10, a writing zone 20 is printed on the top surface 16 of each wrap layer 14 by conventional means such as with a laser printer. The writing zone is preferably an enclosed box or other confined area but may also be a single line that can be written on. Designs and logos 22 may also be printed on the top surface of each wrap layer.

In use, a child first writes his or her name or some other identifying mark in the writing zone 20 of each wrap layer

14 while the wrap layers are still adhered to the release layer 12. The child then removes a wrap layer 14 from the release layer 12 and applies the self-adhesive bottom surface 18 of the wrap around the circumference of the writing instrument 11. This strengthens the writing instrument 11 and displays the writing zone 20 on the exterior of the writing instrument so that the child can identify his or her writing instruments.

Advantageously, the present invention can be incorporated into an educational or learning program for children. For example, an apparatus 10 including a plurality of wrap layers 14 could be sold with or alongside a box of crayons. The wraps 14 in the set could each be formed of paper that is colored to match the color of a particular crayon in the box of crayons.

The program would instruct a child to write his or her name or other identifying mark in the writing zone 20 of each wrap 14, match each wrap with its corresponding crayon, and then apply the wraps to the corresponding crayons. This program would not only teach a child how to strengthen and personalize his or her crayons, but would also teach color matching.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A method for strengthening crayons each having a pre-existing paper cover wrapped about its circumference, the paper cover having writing thereon, the method comprising the steps of:

providing a set of crayons of a plurality of different colors;

creating a plurality of wraps, each of the wraps being formed of paper material and having a top surface and a bottom, self-adhesive surface carried on a release layer, each of the wraps having a length less than the length of the crayons and a width substantially equal to the circumference of the crayons, each of the wraps having a color corresponding to a color of at least one of the crayons;

printing a writing zone on the top surface of each of the wraps;

color-matching the wraps with the crayons to match each of the wraps with one of the crayons having a same color as the wrap;

removing the wraps from the release layer; and wrapping the wraps around the corresponding color-matched crayons by wrapping the bottom, self-adhesive surface of each wrap around the circumference of the corresponding color-matched crayon so that it completely covers the pre-existing paper cover of the crayon to hide the printing on the pre-existing cover, to strengthen the crayon, and to display the writing zone on the exterior of the crayon.

* * * * *